United States Patent [19]

Ruisi

[11] Patent Number: 4,956,199
[45] Date of Patent: Sep. 11, 1990

[54] METHOD OF MAKING ROOFING PLIES, INCLUDING METHOD OF APPLYING THE SAME TO A ROOF

[76] Inventor: Santo J. Ruisi, 10 Dunton Ave., Deer Park, N.Y. 11729

[21] Appl. No.: 404,260

[22] Filed: Sep. 7, 1989

[51] Int. Cl.⁵ .............................................. B05B 3/02
[52] U.S. Cl. ..................................... 427/173; 427/198; 427/199; 427/292; 427/204; 427/443
[58] Field of Search .............. 427/204, 186, 403, 443, 427/173, 174, 292; 52/748

[56] References Cited

U.S. PATENT DOCUMENTS

| | | | |
|---|---|---|---|
| 1,808,590 | 6/1931 | Andernach | 427/186 |
| 2,105,531 | 1/1938 | Greider et al. | 427/186 X |
| 2,111,565 | 3/1938 | Limerick | 427/188 X |
| 2,117,355 | 5/1938 | Pearl | 427/186 |
| 2,139,619 | 12/1938 | Howell | 427/186 |
| 3,087,830 | 4/1963 | Schuller | 427/186 |
| 3,617,329 | 11/1971 | Goff | 427/186 |

Primary Examiner—Carl D. Friedman
Assistant Examiner—Hoffert
Attorney, Agent, or Firm—Bauer & Schaffer

[57] ABSTRACT

There is disclosed a method of making a roofing ply by providing a fiberglass mat, feeding the mat through a punching die and punching openings through the surface thereof. The mat is thereafter saturated with melted asphalt at a melting temperature of at least about 450 degrees F to impart an elastic memory to the mat.

7 Claims, 4 Drawing Sheets

METHOD OF MAKING ROOFING PLIES, INCLUDING METHOD OF APPLYING THE SAME TO A ROOF

BACKGROUND OF THE INVENTION

The present invention relates to roofing piles for use in constructing built up roofing systems and particularly, to a method for making improved roofing plies and the application of the same to a roof.

U.S. Pat. No. 4,567,079 discloses a lightweight roofing ply, sheet or membrane intended to provide improved ventability and attachment in a built up roofing system (BUR) comprising successively stacked sheets. To effect this, the patent provides a tar saturated mat having a plurality of holes along its longitudinal margin to facilitate flow of the tar bonding agent between the sheets. While the holes do in fact, make the flow of the bonding agent easier, it has been found that the sheet or ply made in accordance with the aforementioned patent, has severe drawbacks mitigating against its wide acceptance rise giving use to great difficulty in applying the sheet and in providing a firm and secure attachment in the BUR system.

In particular, it has been found that when a hot tar bonding agent is applied to the sheet during the build-up of the roof, the sheet has uneven and unpredictable stretch and cooling characteristics so that the ultimate roofing is neither uniform nor smooth. Air bubbles tend to occur between sheets and the bonding agent does not adhere securely. Further, upon laying lengths of sheet ply along the roof, it has been found that the sheets tend to warp and curve along their length so that sheet linearity and alignment of successive sheets does not occur.

Accordingly, it is an object of the present invention to provide a lightweight roofing ply for use in built up roofing systems (BUR) which avoid the disadvantages and difficulties found in the prior art.

It is a specific object of the present invention to provide a roofing ply (i.e., sheet) for BUR systems which has uniform expansion and contraction characteristic under successive heating and cooling during application to the roof and which maintains a constant linearity, upon application.

In general, it is the object of the present invention to provide a roofing sheet for BUR systems which is easy to manufacture and easy to employ and which, at the same time, results in providing roofing which also has the ability of not only providing good protection, but is easy to apply and use to cover a roof.

The foregoing objects and advantages, together with numerous others are set forth in the following disclosure.

BRIEF STATEMENT OF THE INVENTION

In accordance with the present invention, there is provided a method for making a roofing sheet for use in BUR systems comprising providing a roll of fiberglass mat, punching a plurality of openings through the surface thereof along the marginal length of one side of the mat and across a portion of the width of the surface thereof, saturating the mat with melted asphalt placing said sheet under mild stretching while said mat is maintained in said melted asphalt at a melting temperature of at least 450 degrees F. and thereafter, cooling the saturated mat. Upon cooling, the mat may be rerolled or cut into desired lengths. Granular mineral material may be applied to the mat to provide a non-tacky surface.

The improved roofing sheet is thus provided with an elastic memory of its elongated state, which in combination with the openings, along its entire length, permits the sheet to be laid on the roof in the BUR system avoiding the disadvantages and defects of the prior art.

Preferably the holes punched along the marginal edge are arrayed in a predetermined manner to minimize, in a technological manner, the uneven density and lack of continuity of material in the sheet ply itself which act in combination with the mildly stretched and linear tensioned sheet which provide a memory set in the sheet so that, no matter how many cycles of the heating and cooling subsequently occur during application to the roof, true linearity and an absence of distortion will be the characteristic of the sheet ply in the BUR system.

Full details of the present invention are set forth in the following description and the accompanying illustrations of the preferred method and product.

THE DRAWINGS

In order to understand the present invention more fully, reference is directed to the accompanying drawings which are to be taken in conjunction with the following description and in which drawings.

DESCRIPTION OF THE PREFERRED EMBODIMENTS

Figure 1:
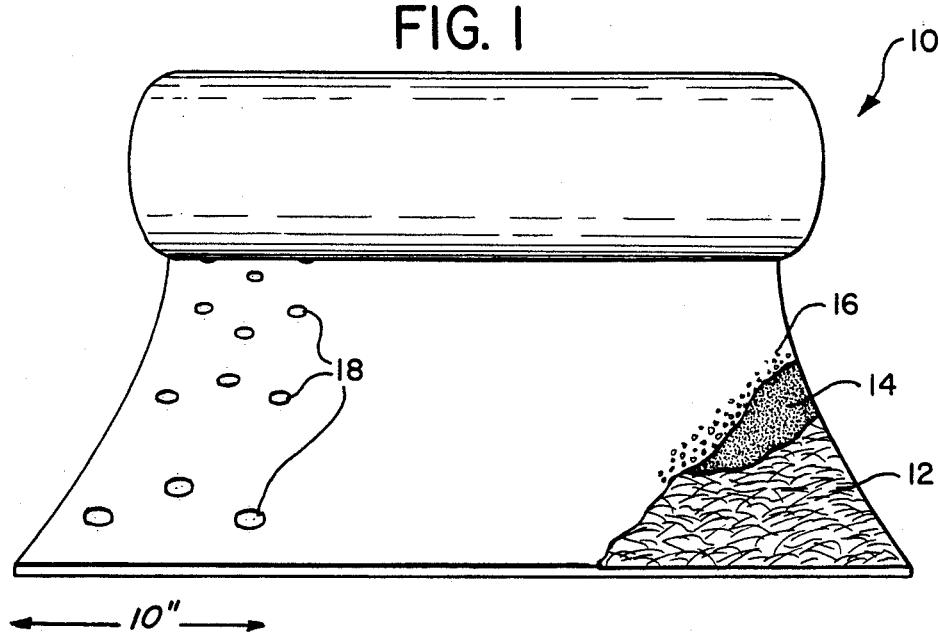
FIG. 1 is a perspective view of a roll of sheet, partially unrolled, made in accordance with the present invention.

As seen in FIG. 1, the sheet ply generally referred to by numeral 10 and formed in accordance with the method of the present invention, comprises a base mat 12 of felted glass fibers, saturated and uniformly covered with a layer 14 of asphalt and finally covered with a layer of fine sand or gravel 16.

Fiberglass mats having a premium type thickness (1/16 –⅛ inch) such as type four no. 7542 or no. 7218 as manufactured and available form the Johns-Manville Corporation are preferable although other base mats of fiberglass may be used. It is preferable that the nonwoven felted mat be accreted in such density as to provide a suitable roofing membrane, and also that it will be capable of being saturated with bitumen or asphalt. That is the bitumen or asphalt should be able to flow into the interstices between the fibers and surround fully the fibers themselves.

The bitumen or asphalt coating 14 may be of any commercial type such as four extra steep composition i.e., having a melting temperature substantially in excess of 400 degrees F.

Figure 2:
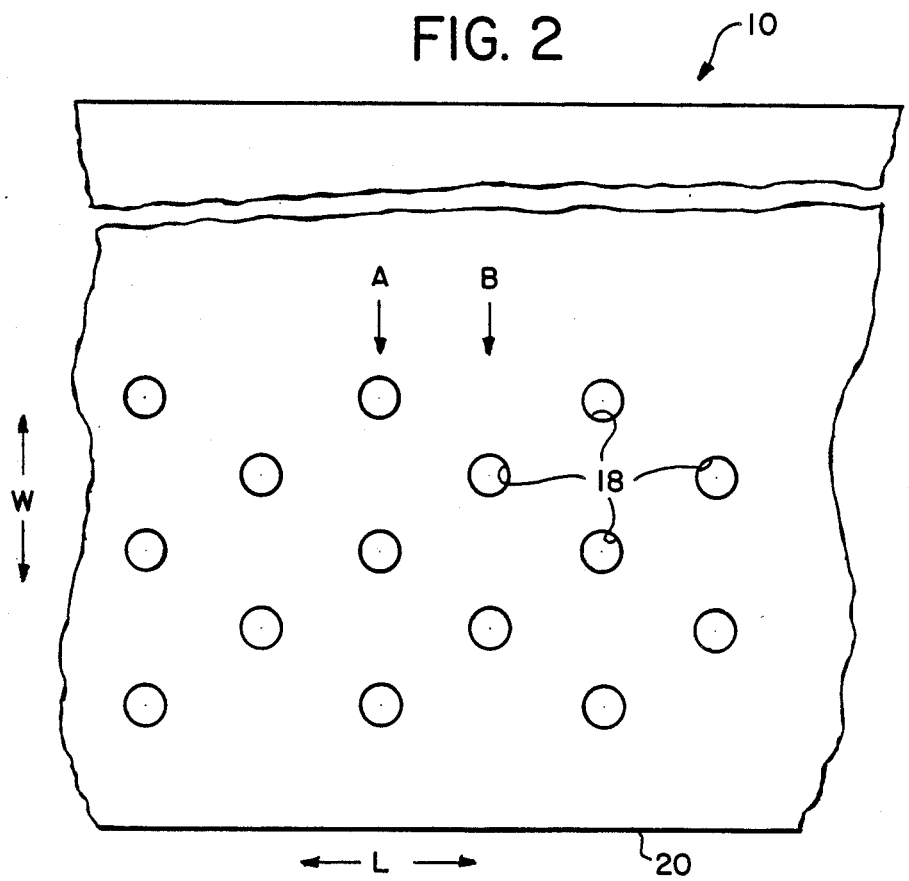
FIG. 2 is an enlarged plan view of the sheet of FIG. 1 showing the distribution of the openings therein.

The holes 18 are preferably formed by die punching the base strip 12 prior to or concomitantly with the process of saturating the base strip with the bitumen or asphalt filler 14. As seen in FIG. 2, the holes 18 are provided running the length of the roofing sheet 10, along its edge 20. For convenience, this edge is denominated the leading longitudinal edge since the oposite edge 22 is intended to be the trailing edge of the sheet ply from which successive plies are laid when applied on the roof. Preferably, the holes 18 are arrayed in a predetermined pattern three rows (ranks) parallel to the leading longitudinal edge 20, having alternating parallel rows (files) A and B in each of which the holes are aligned perpendicular to the edge 20. Row A comprises three holes while its adjacent row B comprises two holes. The ranks A and B alternate with each other so that each hole regardless of rank or file is approximately 2½ inches from each other, with the holes in row A closest to the forward longitudinal edge 20 set back from the forward edge 20 by approximately two inches, and the entire array extends inward to the sheet 10 within a 10 inch margin.

Thus, the number of holes in longitudinal alignment adjacent the forward edge 20 are fewer than the number of holes in a longitudinal row inwardly of the sheet ply. As a consequence, less strain is placed on the glass mat adjacent the forward edge resulting, it is believed, in greater uniformity under heat stress.

Figure 3:
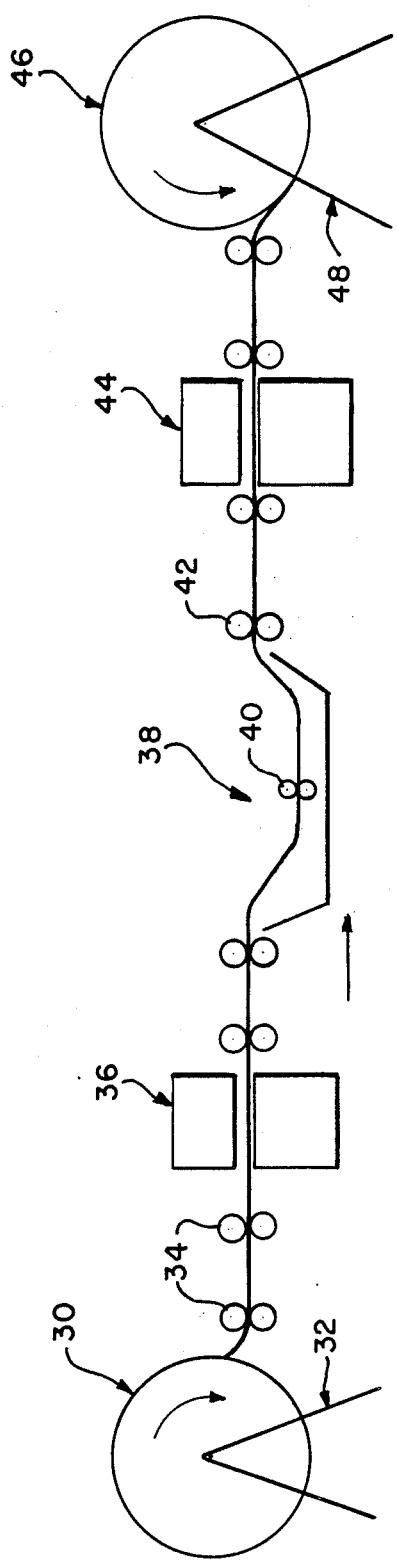
FIG. 3 is a flow diagram illustrating the inventive method for making roofing sheet.

The method by which the present roofing sheet is made, is illustrated in FIG. 3. Initially, a substantially endless roll of fiberglass mat 30 is mounted on a feed supply mechanism 32 and drawn off by rollers 34 into a punch press 36 fitted with a plurality of circular, oblong, etc., dies appropriately arrayed to make the holes 18 in the longitudinal margin of the moving mat from the punch press 36, the mat is fed to an immersion tank 38 containing hot asphalt or between. The tank 38 is provided with at least two heat zones so that the temperature of the mat can be more or less gradually raised from the downstream end to the upstream end. The tank 38 is also provided with a roller pair 40 within the tank and a discharge roller pair 42 exterior of the tank so that the speed of the two roller pairs 40 and 42 can be controlled to provide a slight pull or mild stretch on the mat as it moves through the tank 38. From the tank 38, the saturated mat moves into a sand application device-and cooling chamber 44 and is finally collected as a sheet roll 46 on the take up mechanism 48. In lieu of the roll mechanism 48, a sheet cutter can be provided to sever the endless sheet should that be desired.

Asphalt having a melting temperature greater than 400 degrees F. is introduced into the tank 38 and brought to melting temperatures therein in any conveniently suitable manner. Similarly the asphalt temperature is raised in the second zone to a temperature substantially in excess of 450 degrees F. The temperature can reach well above 450 degrees F. provided that no damage such as charing or reactive destrruction occurs in the asphant. The sheet is held in the high temperature asphalt for a time sufficient to totally saturate the fiberglass mat.

As the sheet or mat is withdrawn from the tank 48, the upstream roller pair 42 is speeded up relative to the trailing collar pair 40 so that the heated glass mat is stretched mildly and placed under a slight longitudinal tension. Notwithstanding subsequent cooling and possible contraction of the saturated mat, the resultant sheet will retain a "memory" of its initial condition and when subsequently heated and cooled, will expand and contract linearly avoiding any distortion. The degree of stretching and elongation can vary within the limits of the construction of the mat whereby the integrity and strength of the mat is maintained. After saturation, the covering sand or other suitable granular mineral material is applied to the saturated mat as it passes through the cooler 44 wherein it is simultaneously cooled. Cooling air supply is preferred. The sand acts to dry and leave the sheet manipulatable to the hand.

During saturation with the melted asphalt, an elastic memory is imparted to the fiberglass mat and although the mat becomes slightly elongated as it is pulled through the apparatus by the take-up roll and becomes fixed in the elongated state during cooling, it has a tendency to return to its stable state upon use when it is being applied to a roof and covered with a layer of hot asphalt, as explained more fully hereinbelow.

The speed at which the fiberglass mat is passed through the above-described apparatus can vary widely, being at least enough to move it through the required method stages, but not so fast that it is not saturated with the asphalt or have only a small amount of granulated mineral material applied thereto, can be properly cooled. In general, the mat may be passed through the apparatus at a rate of from about 250 feet per minute to as high as about 350 feet per minute, and preferably at a rate of about 300 feet per minute, although routine testing can be used to determine the most efficacious speed.

Due to the high temperature of the melted asphalt, an elastic memory is imparted to the fiberglass mat and later applied to a roof and coated with melted asphalt, and then returned to its stable state.

In accordance with the inventive method, the fiberglass mat, after saturation with the melted asphalt may have the granular mineral material, such as sand, applied to one surface thereof and the cooling air may be impinged on the opposite surface, or, if desirable, the mineral material may be applied to both surfaces and the mat may be cooled by directing cooling air on both surfaces for a period of time to cool the surfaces and solidify the asphalt. If desired, application of mineral material and cooling can be carried out simultaneously.

The width of the fiberglass mat may vary and it is stored and/or employed in roll form, if desired, to cut into appropriate lengths to provide strips of required "squares". The term "square" in the roofing industry is the standard by which a length of ply is gauged to cover a given area of roof as by multiplying the width of sheet ply by its length. For example, a roll of 180 feet in length and a width of 36 inches, provides 5 squares which is the equivalent of approximately 540 square feet.

Figure 4:
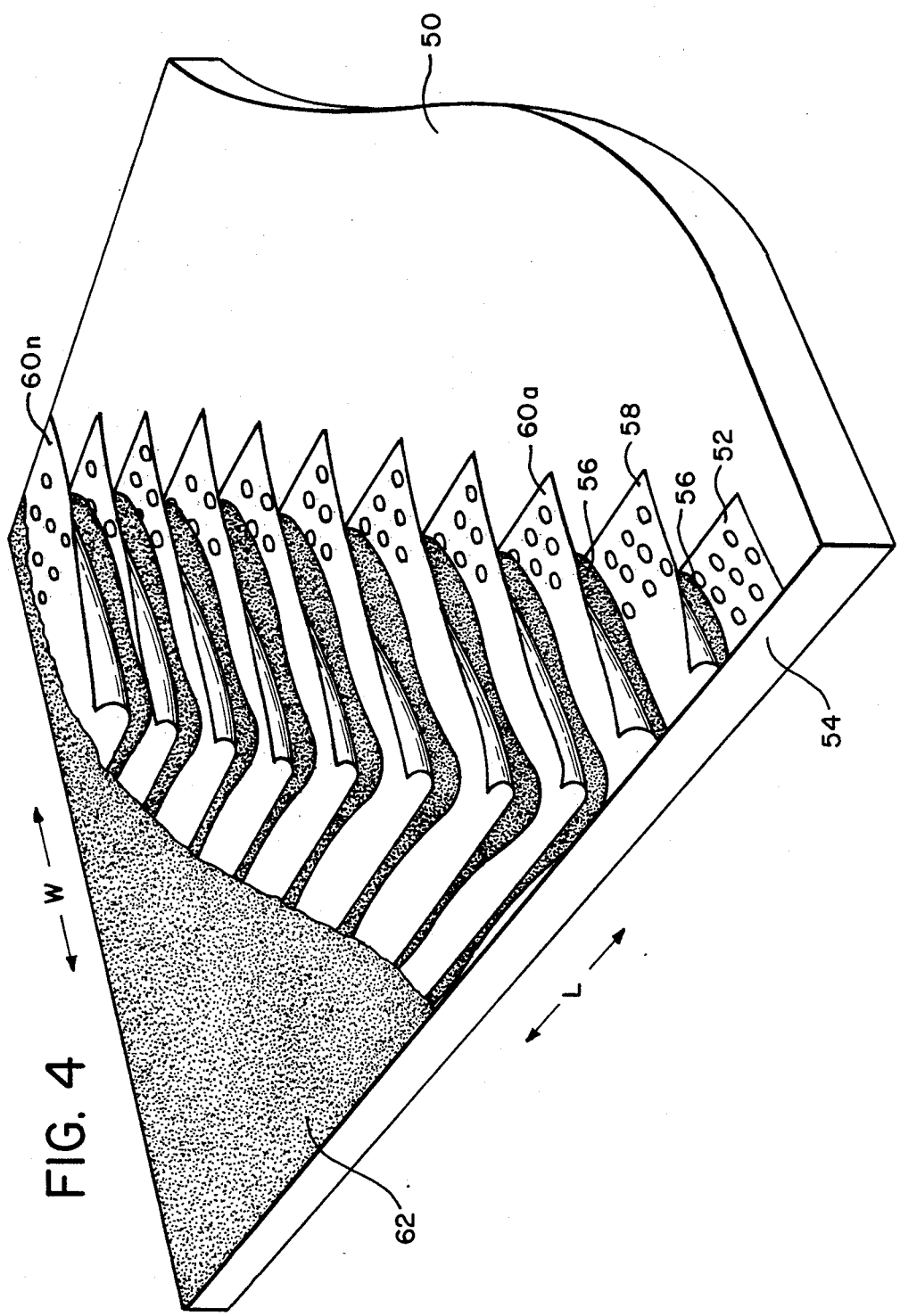
FIG. 4 is a partial view in perspective illustrating a BUR system showing the application of plurality of sheets to a roof.

Now, turning to FIG. 4, the method for applying built up roofing plies to a roof 50 comprises applying a fiberglass mat strip 52 (FIG. 4) to the edge of a roof 54 along the entire length thereof. This strip 52 is made in accordance with the procedure set forth above, except that it is longitudinally cut to provide a width approximately one-third the width of the standard sheet being used to complete the roofing, and it is provided with off-set punched openings 18 extending across its entire width. Like the above-mentioned plies, strip 52 has an elastic memory and is in an elongated state. The strip 52 is laid in place on the roof from edge 54 along the entire length thereof and a layer of melted asphalt 56 is swept or brushed in accordance with known procedures across the entire surface of the strip. Due to the elastic memory of the strip, the strip cools to its stable state and is adhered to the roof surface by the asphalt passing through the openings therein. A second ply or sheet 58, having a width twice that of the first sheet 50 (e.g. ⅔ standard), is placed over the first sheet, also beginning from the edge of the roof and also bonded with another layer of asphalt 56 or other bitunen material. Subsequently, a succession of sheet plies 60 are laid one over the other in staggered arrangement toward the roof opposite edge 54 which is covered with overlapping portions of the successive roofing sheet 60a-60n without the openings being placed at the openings of a preceeding sheet by sweeping or brushing and adhering the successive plies to each other and to the roof. As with the strip 52, the asphalt passes through the openings in the successive plies and these plies also return to their stable state due to the excessive heat temperature of the asphalt or the cooling and solidification of the asphalt takes place.

The final layer of roofing sheet 60n may be covered with a holeless sheet or merely with the asphalt layer 62.

The instant method for making a roofing ply and applying the same to a roof present many advantages. For example, it can be achieved in a relatively simple manner, with simple apparatus and employing readily available equipment and materials.

Moreover, due to their unique physical construction and practices, such as the elastic memory, the methods provide an advantageous but simple manner for the manufacture and use of the materials is made which result in a strong, durable roof covering. Numerous other advantages of this invention will be readily apparent to those skilled in the art.

Therefore, it is to be understood that many variations of this invention can be made without departing from the spirit and scope thereof, and the invention is not to be limited to the described embodiments, except as defined in the appended claims.

What is claimed is:

1. A method for making a roofing sheet comprising providing a substantially endless length of fiberglass mat, feeding said mat through a punching die and punching a plurality of openings through said mat along the length of one side edge of said mat and extending toward the opposite side edge for about $\frac{1}{3}$ of the width of the mat, saturating said mat with melted asphalt at a temperature of at least about 450 degrees F. while simultaneously mildly stretching said mat to impart an elastic memory to said mat, applying granular mineral material to said heated saturated mat, and cooling said saturated mat.

2. The method according to claim 1, wherein the openings in the fiberglass mat are disposed in a plurality of rows and are uniformly off-set from each other.

3. The method according to claim 1, wherein said holes are off-set approximately two and one half inches.

4. The method according to claim 1, wherein the openings have a diameter of approximately three-fourths of an inch.

5. The method according to claim 1, wherein the granular mineral material is sand.

6. The method according to claim 1, wherein the fiberglass mat is passed through a bath of melted asphalt at a speed in a range of from about 250 feet per minute to about 350 feet per minute to saturated said mat with said asphalt.

7. The method according to claim 1, wherein the fiberglass mat is passed through a bath of melted asphalt at a speed of about 300 feet per minute.

* * * * *